March 29, 1932.  L. H. THOEN  1,851,410
HARVESTER
Filed May 28, 1929  4 Sheets-Sheet 1
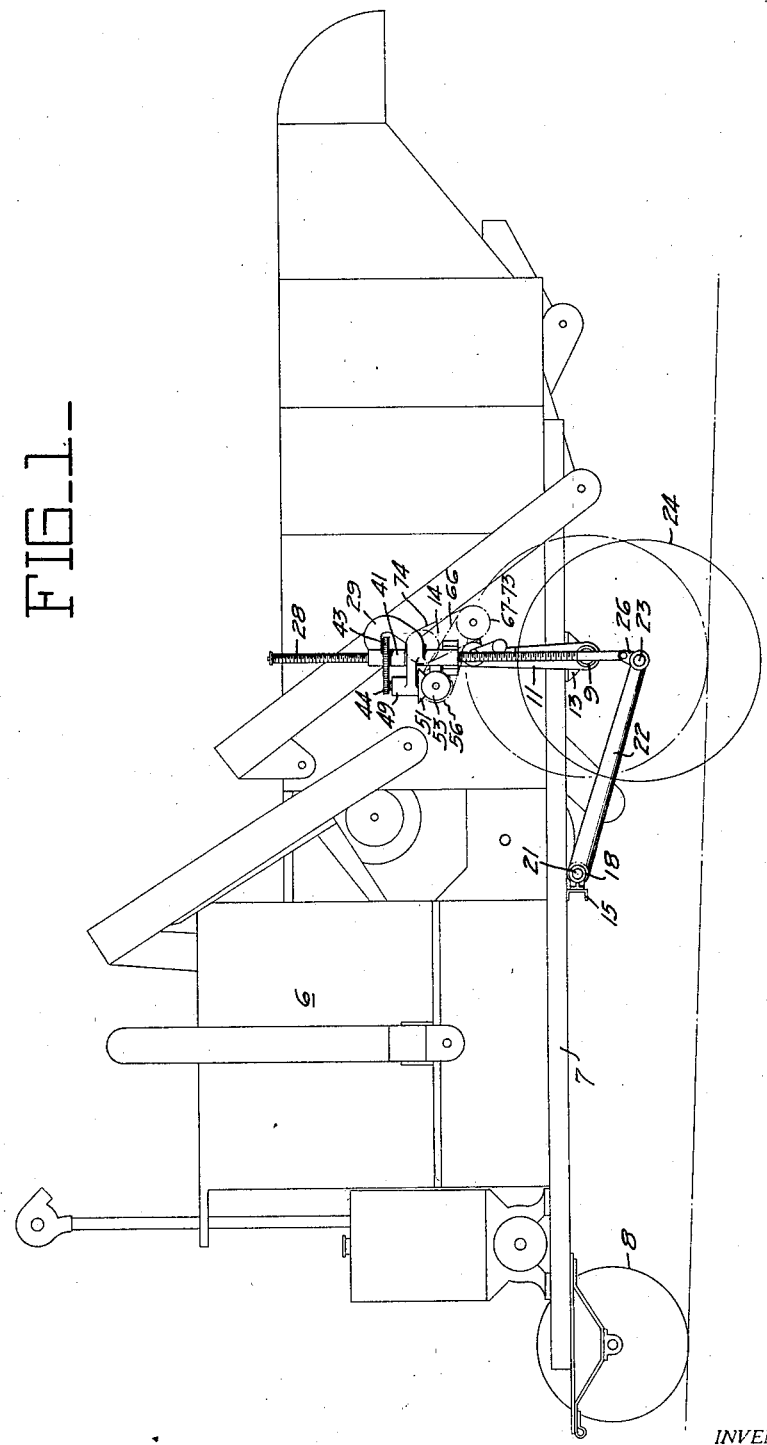
FIG_1_
INVENTOR
Lowell H. Thoen
BY White, Prost & Fryer
ATTORNEYS

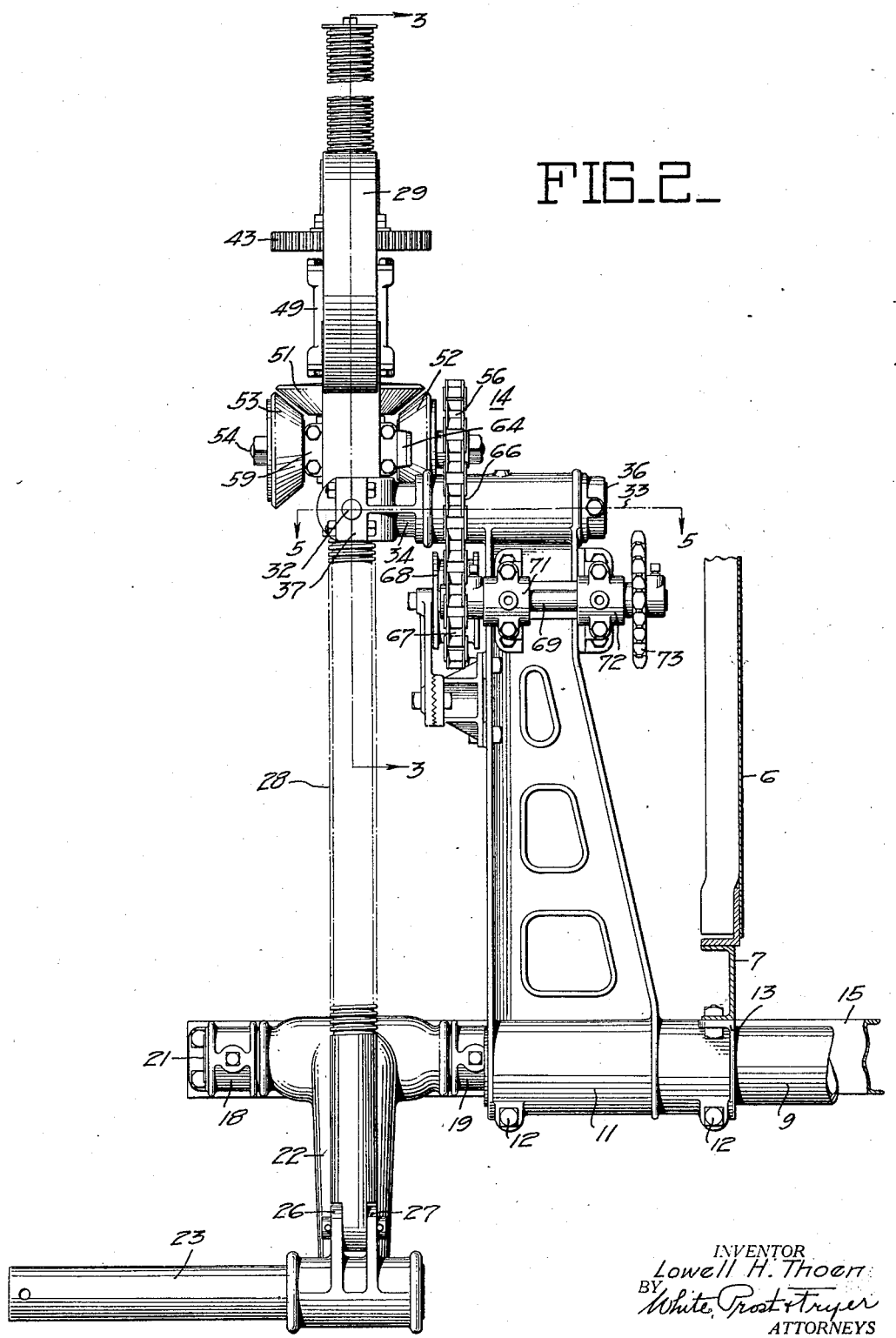

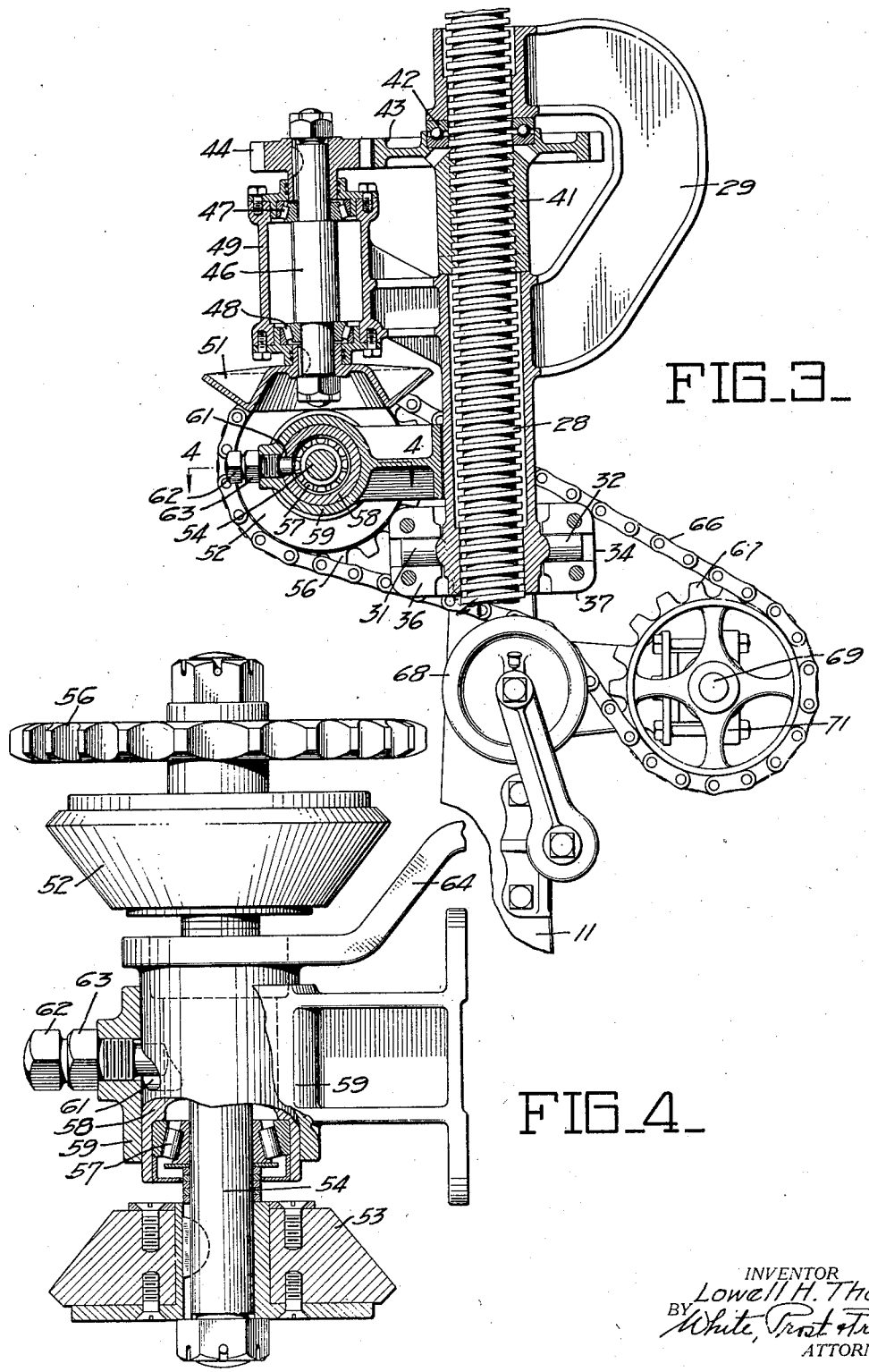

March 29, 1932.  L. H. THOEN  1,851,410
HARVESTER
Filed May 28, 1929   4 Sheets-Sheet 4
FIG_5_
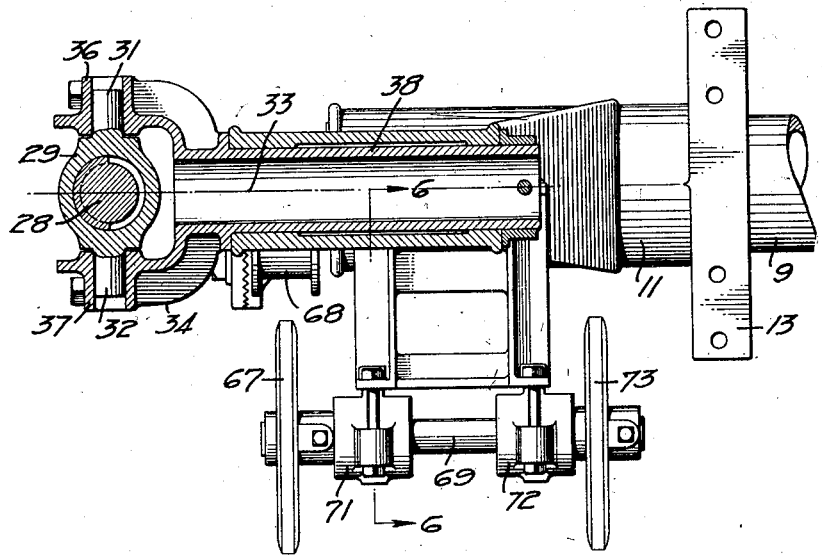
FIG_6_
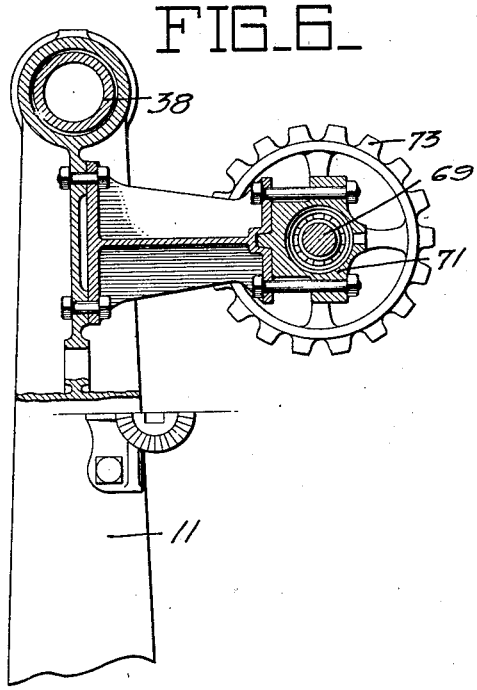
FIG_7_
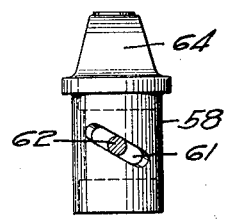
INVENTOR
Lowell H. Thoen
BY White, Prost & Fryer
ATTORNEYS Patented Mar. 29, 1932

1,851,410

UNITED STATES PATENT OFFICE

LOWELL H. THOEN, OF STOCKTON, CALIFORNIA, ASSIGNOR TO CATERPILLAR TRACTOR CO., OF SAN LEANDRO, CALIFORNIA, A CORPORATION OF CALIFORNIA

HARVESTER

Application filed May 28, 1929. Serial No. 366,559.

My invention relates to harvesters adapted to be propelled over a field of grain for cutting and threshing the grain therein. Such harvesters must be adaptable to all different contours and conditions of terrain, including not only level fields but also rolling country and hills. In harvesters now constructed it is essential in the harvesting operation that the separating mechanism be kept approximately level despite the character of the country over which the vehicle is propelled. To meet this need harvesters have been constructed for operation on hillsides and in rolling country and these are usually termed side-hill harvesters. They are provided with an adjustment for varying the spacing vertically of the major supporting wheels in such a fashion that the wheels can accommodate themselves to an inclined surface while the harvester body remains approximately level. This has led to the production of level land harvesters as one class, and the production of side-hill harvesters as a distinct class which differ so materially that it is necessary to consider them separate units in a manufacturing scheme and they are dealt with in commerce as two distinct types of mechanism.

It is an object of my invention to provide an attachment for a standard level land harvester which will permit it to be used as a side-hill machine.

Another object of my invention is to simplify the mechanism for adapting a harvester to side-hill work.

Another object of my invention is to provide a power operated means for adjusting the side-hill harvester to different degrees of ground inclination.

A further object of my invention is to provide an improved supporting means for the side-hill adjusting mechanism.

The foregoing and other objects are attained in the embodiment of the invention shown in the drawings, in which Fig. 1 is a side elevation of my harvester attachment applied to a harvester.

Fig. 2 is an end elevation of the harvester attachment of my invention.

Fig. 3 is a cross section on the line 3—3 of Fig. 2.

Fig. 4 is a plan showing in detail the friction drive cones, certain portions being broken away to disclose the interior mechanism. The portions in Fig. 4 which are in section are on the plane indicated by line 4—4 of Fig. 3.

Fig. 5 is a cross section on the line 5—5 of Fig. 2.

Fig. 6 is a cross section on the line 6—6 of Fig. 5.

Fig. 7 is a detail of the drive cone actuator.

In its preferred form, the harvester attachment of my invention comprises an auxiliary axle attached to a standard harvester and carrying crank arms for engagement with the ground contacting wheels, and includes also a variable spacing means between the crank arms and the standard harvester axle for regulating the degree of spacing of the ground wheels from the harvester body.

As disclosed in the drawings, I preferably attach the device of my invention to a standard harvester 6 which is provided with a framework 7 at its forward end bearing on a steering wheel 8 and which at its rearward end carries a standard axle 9. In providing the standard harvester with the attachment of my invention I preferably remove each of the usual ground engaging wheels from the standard axle 9 and substitute for each of them a bracket 11 disposed at one side of the harvester and clamped to the axle by bolts 12 and fastened to the frame by a bolted flange 13. It is to be understood that the attachment of my invention is in two units, one on each side of the machine, but since these units are identical I shall describe but one of them herein.

The bracket 11 being attached non-rotatably to the axle 9 and to the frame extends upwardly to carry power driven adjusting mechanism generally designated as 14 and which will be hereinafter described. There is secured to the frame 7 a cross member 15 carrying at its extremities bosses 18 and 19 between which is mounted a stub or auxiliary axle 21. Journalled on the axle 21 is a crank arm 22 extending rearwardly of the harvester and at its trailing end carrying an axle shaft 23 for reception of a ground wheel 24. The ground engaging wheel 24 is free to pivot about the axis of auxiliary axle 21 in a vertical plane to vary the distance between the ground engaging portion of the wheel and the body of harvester 6. In this fashion the inclination of the harvester body with respect to the ground can be altered to accommodate the vehicle to operation over undulatory or hilly country.

As a means for selectively locating the ground engaging wheel with respect to the harvester body I provide the adjusting mechanism 14 previously mentioned. Fastened to the crank arm 22 adjacent axle 23 is a pair of ears 26 and 27 between them carrying pivotally a screw shaft 28. This shaft extends approximately vertically and is threaded throughout substantially its entire length. Encompassing the screw shaft is a carrier 29 preferably of bifurcated construction and provided adjacent its lower end with a pair of trunnions 31 and 32 the axis of which is perpendicular to the axis of the screw shaft and which likewise is perpendicular to the axis 33 of a yoke 34 the separate arms of which 36 and 37 respectively encompass the trunnions for pivotal movement with respect thereto and the shank 38 of which is journalled in the upper end of bracket 11. The universal mounting for screw shaft 28 is to permit the lower end of the screw shaft to swing in an arc about the axis of axle 21 and the upper end thereof to oscillate slightly, transversely of the harvester, to compensate for any strains and stresses due to misalignment thereof.

In order to dispose the screw shaft 28 in any selected axially translated position with respect to carrier 29 I preferably provide a nut 41 engaging the threads of the screw shaft and located between the bifurcated portions of the carrier 29. Expediently, a thrust bearing 42 is interposed between the upper arm of carrier 29 and the upper end of nut 41. Formed integrally with the nut is a gear 43. Any convenient means may be provided for rotating the gear 43 to effect axial translation of the screw shaft 28 and preferably I provide power operated means. Meshing with gear 43 is a pinion 44 mounted on the upper end of a shaft 46 suitably journalled in bearings 47 and 48 mounted in a boss 49 projecting from the carrier 29. At the lower end of shaft 46 I provide a friction wheel 51 which is keyed thereto and rotates in unison with the pinion 44. The friction wheel is selectively engaged by either one of two friction cones 52 and 53 which are fixed on a cross shaft 54 extending with its axis perpendicular to the axis of shaft 46 and carrying a drive sprocket 56 at its extremity. The shaft 54 is mounted in such a fashion that it may be axially moved to engage either cone 52 or cone 53 with the friction wheel 51 in order to impart motion in either of two different directions to the shaft 46. Surrounding and supporting the shaft 54 are bearings 57 held against axial movement on the shaft and in turn mounted in a sleeve 58 rotatably confined in a collar 59 bolted to carrier 29.

In order to impart an axial translation to the sleeve 58 upon rotary movement thereof I preferably provide the sleeve with a helical slot 61 into which projects a set screw 62 held in place in the collar 59 by a lock nut 63. Connected to the sleeve 58 is a handle 64 for rotating the sleeve. It will be appreciated that upon movement of the handle, the sleeve is both rotated and translated axially so that either one or the other of the friction cones 52 and 53 is moved into frictional engagement with the friction wheel 51. Since the shaft 54 is rotated through the medium of sprocket 56, a corresponding rotation is imparted to shaft 46 and to the nut 41. Depending upon which of the cones 52 or 53 is in engagement with the friction wheel, the nut will cause axial movement of the screw shaft 28 to pivot the crank arm 22 either upwardly or downwardly, thereby varying the relationship between the ground engaging wheel and the body of the harvester.

Preferably I utilize the source of power ordinarily available on the harvester for actuating the adjusting mechanism previously described. A sprocket chain 66 engages the sprocket wheel 56 and engages as well a second sprocket 67. An idler 68 bears against the chain and keeps it properly tautened. The sprocket 67 is on a shaft 69 mounted in bearings 71 and 72 fastened to the bracket 11. A sprocket 73 meshes with a chain 74 connected with the harvesting mechanism so that the sprockets are driven while the harvester mechanism is being rotated.

In any given adjusted position of the ground engaging wheels with respect to the harvester body, both friction cone 52 and friction cone 53 are out of engagement with the friction wheel 51 and the pitch of the thread on the screw shaft 28 is such that no movement between the nut 41 and the screw shaft takes place and the ground engaging wheels remain in their adjusted position. Upon movement of the lever 64, however, either one or the other of the friction wheels is engaged at the discretion of the operator and through the train of mechanism the nut 41 is revolved by power to raise or lower the ground engaging wheels. It is customary to raise the wheel on one side of the machine while lowering the wheel on the other side of the machine to accommodate the entire harvester to an inclination of the field in which it is working. However, in order to gain height to clear obstructions or to lower the harvester body both of the ground spacing mechanisms may be operated simultaneously in the same direction.

It will be appreciated that I have provided a harvester attachment which can be applied to a standard harvester with substantially no change thereof and which renders the standard harvester variable for use in hilly and undulatory country. Furthermore, the power required to effect the adjustment of the harvester to its peculiar conditions is derived from the engine and is completely under control of the harvester operator.

It is to be understood that I do not limit myself to the form of the harvester attachment shown and described herein, as the invention, as set forth in the following claims may be embodied in a plurality of forms.

I claim:

1. A harvester attachment comprising a crank arm pivoted to said harvester, a ground engaging wheel mounted on said crank arm, a standard axle on said harvester, and positioning means connecting said standard axle and said crank arm.

2. A harvester attachment comprising a crank arm pivoted to said harvester, a ground engaging wheel connected to said crank arm, a standard axle on said harvester, and load-supporting means for variously positioning said wheel with respect to said standard axle.

3. A harvester attachment comprising a standard axle on said harvester, a ground engaging wheel, and load-supporting means carried on said axle for variously positioning said wheel vertically with respect to said standard axle.

4. A harvester attachment comprising a standard axle on said harvester, an auxiliary axle, a ground engaging wheel on said auxiliary axle, and means interposed between said standard axle and said auxiliary axle for varying the spacing of said axles.

5. A harvester attachment comprising a standard axle on said harvester, an auxiliary axle mounted on said harvester to pivot about an axis parallel to said standard axle, and an extensible member connecting said standard axle and said auxiliary axle to effect pivotal movement of said auxiliary axle.

6. A harvester attachment comprising a standard axle, a crank arm mounted on said harvester to pivot about an axis parallel to said standard axle and remote therefrom, an auxiliary axle mounted on said crank arm adjacent said standard axle, a ground engaging wheel on said auxiliary axle, and extensible load-supporting means connecting said crank arm and said standard axle.

7. A harvester attachment comprising a crank arm pivotally connected to said harvester, a ground engaging wheel carried by said crank arm, a standard axle on said harvester, a bracket on said standard axle, a screw shaft connected to said crank arm, and a nut rotatably mounted on said bracket and engaging said screw shaft.

8. A harvester attachment comprising a frame, a pair of axles mounted on said frame, a crank arm pivotally mounted on one of said axles, a wheel mounted on said crank arm, a bracket mounted on the other of said axles, and means for variably positioning said crank arm with respect to said bracket.

9. A harvester attachment comprising a standard axle, a bracket on said standard axle, a yoke pivoted in said bracket, a nut constrained to rotation on said yoke, an auxiliary axle, a crank arm pivoted on said auxiliary axle, a ground engaging wheel on said crank arm, and a screw shaft connected to said crank arm and engaging said nut.

10. A harvester attachment comprising a frame, a standard axle secured to said frame, a bracket affixed to said axle, a yoke mounted on said bracket to pivot about an axis, a carrier mounted on said yoke to pivot about a second axis parallel to said axis, a nut constrained to rotation in said carrier, an auxiliary axle secured to said frame, a crank arm pivotally mounted on said auxiliary axle, a ground engaging wheel rotatably mounted on said crank arm, and a screw shaft pivoted to said crank arm and engaging said nut.

11. A harvester, a wheel, and adjusting means for said wheel comprising a member connected thereto and universally connected to said harvester.

12. A harvester, a wheel, and an adjustable support for said wheel comprising a crank axle on said harvester and a member universally connected to said harvester.

13. A harvester, a wheel, and an adjustable support for said wheel comprising a crank axle on said harvester and a screw shaft universally connected to said harvester.

14. A harvester, a crank axle on said harvester, adjusting means therefor and a unitary support for said adjusting means having a single point of attachment to said harvester.

15. A harvester, a crank axle on said harvester, adjusting means therefor, a unitary support for said adjusting means, and a universal connection between said adjusting means and said support.

16. A harvester, a crank axle on said harvester, and adjusting means therefor carried only on an axle of the harvester.

17. A harvester having an axle, a crank axle on said harvester, adjusting means for said crank axle, and a unitary support for said adjusting means carried on said harvester axle.

18. A harvester having an axle, a crank axle on said harvester, adjusting means for said crank axle, a unitary support for said adjusting means carried on said harvester axle and a universal connection between the crank axle and said harvester axle.

In testimony whereof I have hereunto set my hand.

LOWELL H. THOEN.